(12) United States Patent
Yamazaki et al.

(10) Patent No.: US 8,681,140 B2
(45) Date of Patent: Mar. 25, 2014

(54) DISPLAY DEVICE AND ELECTRONIC APPARATUS HAVING THE SAME

(75) Inventors: Shunpei Yamazaki, Tokyo (JP); Jun Koyama, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1071 days.

(21) Appl. No.: 11/131,335

(22) Filed: May 18, 2005

(65) Prior Publication Data

US 2005/0264471 A1    Dec. 1, 2005

(30) Foreign Application Priority Data

May 21, 2004    (JP) .................................. 2004-152553

(51) Int. Cl.
*G09G 5/00*    (2006.01)

(52) U.S. Cl.
USPC .................. 345/211; 345/1.1; 345/82; 345/87

(58) Field of Classification Search
USPC ........................................ 345/211, 1.1, 82, 87
See application file for complete search history.

(56) References Cited

U.S. PATENT DOCUMENTS

| | | | |
|---|---|---|---|
| 6,069,593 A * | 5/2000 | Lebby et al. ................... | 345/1.1 |
| 6,414,443 B2 | 7/2002 | Tsuruoka et al. | |
| 6,528,951 B2 | 3/2003 | Yamazaki et al. | |
| 6,812,981 B2 | 11/2004 | Yoshino | |
| 6,897,914 B2 * | 5/2005 | Yoshida .......................... | 349/65 |
| 7,161,185 B2 | 1/2007 | Yamazaki et al. | |
| 7,184,012 B1 | 2/2007 | Kim | |
| 7,199,520 B2 | 4/2007 | Fujii et al. | |
| 7,215,307 B2 | 5/2007 | Ochi et al. | |
| 7,265,383 B2 | 9/2007 | Yamazaki et al. | |
| 7,289,083 B1 * | 10/2007 | Canova, Jr. .................... | 345/1.1 |
| 7,298,347 B2 | 11/2007 | Yamazaki et al. | |
| 7,327,335 B2 | 2/2008 | Yamazaki et al. | |
| 7,330,163 B2 | 2/2008 | Nakai et al. | |
| 7,332,858 B2 | 2/2008 | Nomura et al. | |
| 7,333,077 B2 | 2/2008 | Koyama et al. | |
| 7,336,252 B2 * | 2/2008 | Tsuyuki et al. ................. | 345/96 |
| 7,345,661 B2 | 3/2008 | Miyagawa et al. | |
| 7,355,338 B2 | 4/2008 | Osame et al. | |
| 7,389,476 B2 | 6/2008 | Senda et al. | |
| 7,400,097 B2 | 7/2008 | Maede et al. | |
| 7,400,261 B2 | 7/2008 | Watanabe et al. | |
| 7,843,400 B2 | 11/2010 | Nakai et al. | |
| 2001/0034249 A1 * | 10/2001 | Peuhu et al. ................... | 455/566 |

(Continued)

FOREIGN PATENT DOCUMENTS

| EP | 1168291 A2 | 1/2002 |
|---|---|---|
| EP | 1355289 A2 | 10/2003 |

(Continued)

*Primary Examiner* — William Boddie
*Assistant Examiner* — Leonid Shapiro
(74) *Attorney, Agent, or Firm* — Fish & Richardson P.C.

(57) ABSTRACT

A thin display device having a plurality of panels and an electronic apparatus using such a display device are provided at low cost. The display device of the invention has a plurality of display units. A controller IC for controlling a signal supplied to the display units is provided in common for the display units, thereby controlling which of the display units to be supplied with a signal. Similarly, a power supply IC is provided in common for the display units to control which of the display units to be supplied with a voltage.

19 Claims, 14 Drawing Sheets

(56) References Cited

U.S. PATENT DOCUMENTS

| | | |
|---|---|---|
| 2004/0070553 A1* | 4/2004 | Youden .......................... 345/13 |
| 2004/0169624 A1 | 9/2004 | Yamazaki et al. |
| 2004/0227159 A1 | 11/2004 | Nakashima et al. |
| 2004/0227698 A1 | 11/2004 | Yamazaki et al. |
| 2004/0257473 A1 | 12/2004 | Miyagawa |
| 2004/0263056 A1 | 12/2004 | Seo et al. |
| 2004/0263066 A1 | 12/2004 | Abe et al. |
| 2005/0024293 A1 | 2/2005 | Sakata et al. |
| 2005/0024339 A1 | 2/2005 | Yamazaki et al. |
| 2005/0030518 A1 | 2/2005 | Nishi et al. |
| 2005/0052348 A1 | 3/2005 | Yamazaki et al. |
| 2005/0127820 A1 | 6/2005 | Yamazaki et al. |
| 2005/0151830 A1 | 7/2005 | Yamazaki |
| 2005/0253773 A1 | 11/2005 | Sekiguchi |
| 2005/0264471 A1 | 12/2005 | Yamazaki et al. |
| 2007/0200812 A1 | 8/2007 | Maede et al. |
| 2007/0210982 A1 | 9/2007 | Nakai et al. |

FOREIGN PATENT DOCUMENTS

| | | |
|---|---|---|
| EP | 1389775 A2 | 2/2004 |
| EP | 1406240 A2 | 4/2004 |
| JP | 11-160704 A | 6/1999 |
| JP | 2001067049 A | 3/2001 |
| JP | 2001-223074 A | 8/2001 |
| JP | 2001-285445 | 10/2001 |
| JP | 2001-332392 A | 11/2001 |
| JP | 2002055337 A | 2/2002 |
| JP | 2002-072964 A | 3/2002 |
| JP | 2002320006 A | 10/2002 |
| JP | 2003-229953 | 8/2003 |
| JP | 2004-004759 A | 1/2004 |
| JP | 2004070225 A | 3/2004 |
| JP | 2004109595 A | 4/2004 |
| JP | 2004126257 A | 4/2004 |
| JP | 4939770 B2 | 5/2012 |
| WO | 2004/029918 A1 | 4/2004 |
| WO | 2005/088595 A1 | 9/2005 |
| WO | 2005/088596 A1 | 9/2005 |

* cited by examiner

DISPLAY DEVICE AND ELECTRONIC APPARATUS HAVING THE SAME

BACKGROUND OF THE INVENTION

1. Field of the Invention

The present invention relates to a display device having a plurality of display units. In particular, the invention relates to an electronic apparatus provided with the display device, which is typified by a portable terminal such as a mobile phone and a PDA, and a digital camera.

2. Description of the Related Art

A display device that has been developed in recent years uses a liquid crystal panel having a pixel including a liquid crystal or a light emitting panel having a self-light emitting element typified by an electroluminescence (EL) element. The display device using a self-light emitting element is expected to be widely used as a display screen of a mobile phone and the like taking advantages of the self luminous type, such as high image quality, wide viewing angle, and reduced thickness and weight because of no need for backlight.

Further, concerning the portable terminal that has been rapidly popularized in recent years, high added value is required as a result of diversification of the intended use. Accordingly, the portable terminal provided with a first display screen on the front side and a second display screen on the back side has been suggested (see patent document 1).

[Patent Document 1] Japanese Patent Laid-Open No. 2001-285445

SUMMARY OF THE INVENTION

However, when the second display screen is provided in addition to the first display screen, the volume occupied by a substrate and the like mounting a controller IC and the like for controlling the two display screens considerably increases as well as the volume occupied by a module including a backlight and the like. Particularly, in the recent portable terminal, reduction in thickness and weight is significantly advanced and trades off with a high added value. For example, a portable terminal having a plurality of liquid crystal panels or light emitting panels and having display screens on both sides has a configuration where a controller IC, a power supply IC and the like are provided for each panel to control the display screen of each panel. Therefore, a display device having a plurality of display screens and an electronic apparatus including the display device increase in size and cost.

In view of the foregoing, the invention provides a thin display device having a plurality of display units and an electronic apparatus using the display device at low cost.

In order to solve the aforementioned problems of the conventional technologies, the invention will take the following measures.

According to the invention, a display device has a plurality of display units, and a controller IC that is provided in common for the display units and controls a signal supplied to the display units. The controller IC has a unit for determining which of the display units to be supplied with a signal.

According to the invention, a display device has a plurality of display units, and a power supply IC that is provided in common for the display units and controls a voltage supplied to the display units. The power supply IC has a unit for determining which of the display units to be supplied with a voltage.

In the display device having the aforementioned configurations of the invention, the power supply IC for controlling a voltage supplied to the display units and the controller IC are provided in common for the display units. A panel having a display screen can be used for each of the display units. Note that in the invention, the controller IC is an IC (Integrated Circuit) for controlling various signals to display images on a display screen of a panel and the power supply IC is an IC for controlling a voltage to display images on a display screen of a panel.

According to the invention, a display device has a first panel, a second panel, and a controller IC that is provided in common for the first panel and the second panel and controls a signal supplied to the first panel or the second panel. The controller IC has a unit for determining which of the first and second panels to be supplied with a signal.

According to the invention, a display device has a first panel, a second panel, and a power supply IC that is provided in common for the first panel and the second panel and controls a voltage supplied to the first panel or the second panel. The power supply IC has a unit for determining which of the first and second panels to be supplied with a voltage.

According to the invention, a display device has a first panel, a second panel, a controller IC that is provided in common for the first panel and the second panel and controls a signal supplied to the first panel or the second panel, and a power supply IC that is provided in common for the first panel and the second panel and controls a voltage supplied to the first panel or the second panel. The controller IC has a unit for determining which of the first panel and the second panel to be supplied with a signal, and the power supply IC has a unit for determining which of the first panel and the second panel to be supplied with a voltage.

The panel may be a light emitting panel using a light emitting element or a liquid crystal panel. The light emitting panel and the liquid crystal panel can display monochrome or color images.

If the light emitting panel is used in the invention, white light emission can be obtained from a light emitting element. In addition, red, blue, or green light emission can be obtained from a light emitting element by selecting a material of the light emitting element.

The invention also provides an electronic apparatus using the aforementioned display device.

According to the invention having the aforementioned configurations, a controller IC, a power supply IC and the like are provided in common for a plurality of panels, therefore, a thin display device having a plurality of panels and an electronic apparatus using the display device can be provided at low cost.

DETAILED DESCRIPTION OF THE INVENTION

Figure 1A:
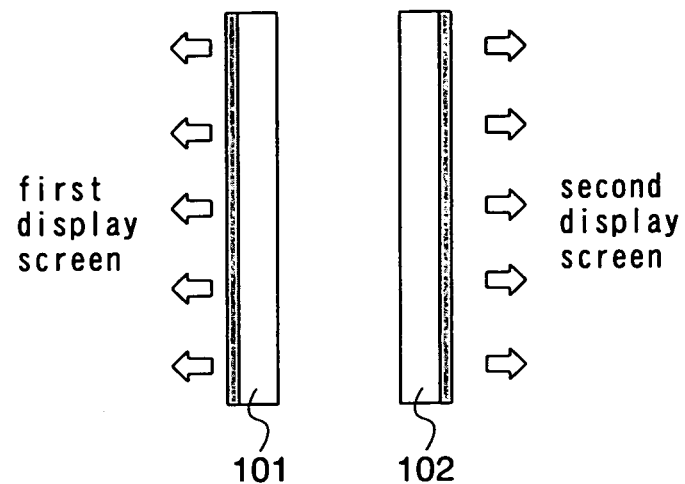
FIGS. 1A and 1B are diagrams each showing a display device of the invention.

Although the invention will be fully described by way of Embodiment Modes with reference to the accompanying drawings, it is to be understood that various changes and modifications will be apparent to those skilled in the art. Therefore, unless such changes and modifications depart from the scope of the invention, they should be construed as being included therein. Note that in the configurations of the invention described below, the same component is denoted by the same reference numeral in all the drawings.

Embodiment Mode 1

A configuration of a display device according to the invention is described in detail with reference to FIGS. 1A and 1B. FIG. 1A shows a display device using two panels that are a first panel 101 and a second panel 102. For the first and second panels 101 and 102, a light emitting panel using a self-light emitting element or a liquid crystal panel having a pixel including a liquid crystal is employed. In that case, four combinations are possible: a light emitting panel is used for both the first panel and the second panel, a liquid crystal panel is used for both the first panel and the second panel, and a light emitting panel is used for one of the first panel and the second panel and a liquid crystal panel is used for the other thereof.

Figure 1B:
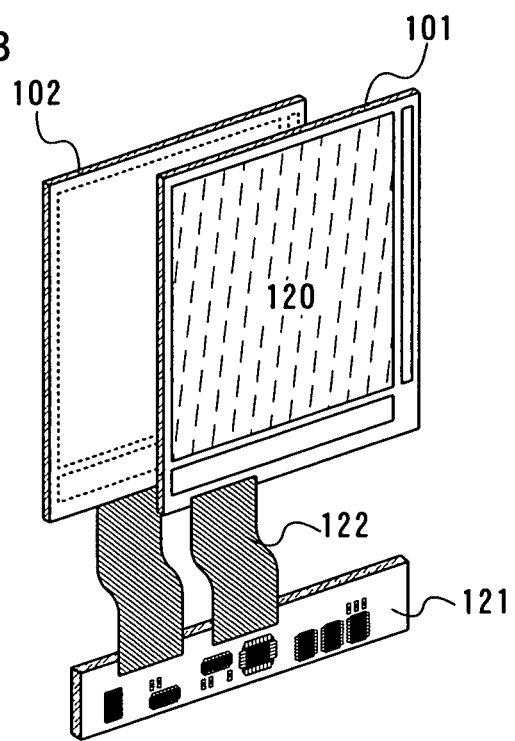

FIG. 1B shows a configuration example of a module of the first panel 101 and the second panel 102. According to the invention, an element group such as a controller IC and a power supply IC for controlling display screens of the first and second panels 101 and 102 is provided over a substrate 121 in common for the first panel 101 and the second panel 102 each having a pixel portion 120. That is, a single element group having a controller IC, a power supply IC and the like is provided in common for the first and second panels 101 and 102, and connected to the first and second panels 101 and 102 through an FPC (Flexible Printed Circuit) 122, thereby the respective display screens of the two panels are controlled.

In general, when images are displayed on display screens of a plurality of panels, a power supply IC is required to be provided for each panel since each panel has different sizes and different voltages are required to be supplied thereto. In addition, it is necessary to provide a controller IC for each panel in order to display different images on a display screen of each panel at a time. Therefore, in a display device having a plurality of display screens, a plurality of controller ICs, power supply ICs and the like are provided independently in accordance with the number of display screens. According to this embodiment mode, however, images are not simultaneously displayed on different panels, and thus a controller IC and a power supply IC are provided in common for a plurality of display screens. Note that the controller IC, the power supply IC and the like are connected to the first and second panels 101 and 102 through the FPC 121 in this embodiment mode, though they may be formed directly on the FPC 121.

The display device of the invention is described next with reference to FIGS. 6A and 6B and FIG. 7 taking as an example a flip mobile phone that has a first panel on the front side and a second panel on the back side.

Figure 6A:
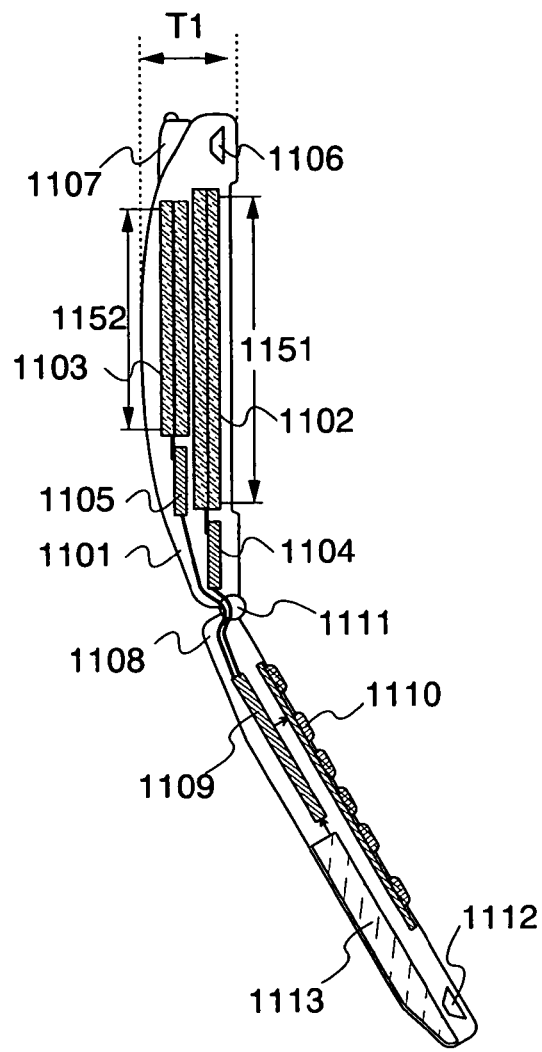
FIGS. 6A and 6B are cross sectional views of a flip mobile phone.
Figure 6B:
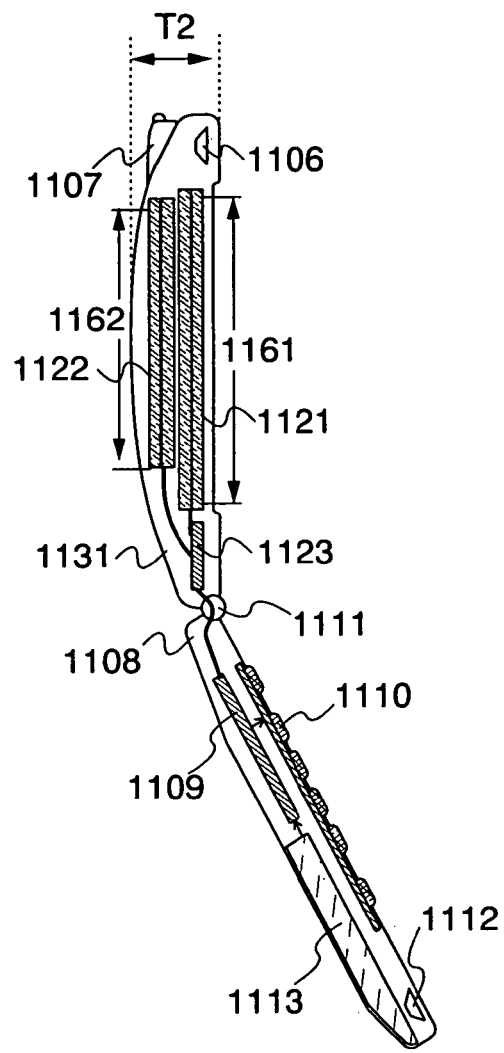

FIGS. 6A and 6B are cross sectional views of a flip mobile phone. FIG. 6A shows a flip mobile phone provided with first and second panels using the conventional display device, whereas FIG. 6B shows a flip mobile phone provided with first and second panels using the display device of the invention. In order to clearly show the differences between them, the same components are configured in the same manner.

A mobile phone shown in FIG. 6A has a first housing 1101 and a second housing 1108 and can be folded. The inner surface (the surface that is not exposed when the mobile phone is folded) of the first housing 1101 is provided with a main liquid crystal panel (first panel 1102) for displaying various information such as the calling party's telephone number and e-mail address, the operation procedure, and the time. The outer surface (the surface that is exposed when the mobile phone is folded) of the first housing 1101 is provided with a sub-liquid crystal panel (second panel 1103) for displaying various information similarly to the first panel 1102. Display screens of the first panel 1102 and the second panel 1103 are controlled by an element group 1104 and an element group 1105 respectively each of which has a controller IC, a power supply IC and the like. The first housing 1101 further includes a speaker 1106 and an antenna 1107.

The second housing 1108 includes a main body driving module 1109, an operating button module 1110, a microphone 1112, a battery 1113, and the like. The first housing 1101 and the second housing 1108 are connected with a hinge 1111 that is relatively rotatable, and are opened and closed around the hinge 1111.

The first panel 1102 and the second panel 1103 have a first display area 1151 and a second display area 1152 respectively, and each has a backlight as a light source. The thickness of the housing on the side provided with the display device, namely the first housing 1101 is denoted by T1.

A mobile phone shown in FIG. 6B has a first housing 1131 and a second housing 1108 similarly to FIG. 6A. The inner surface and the outer surface of the first housing 1131 are provided with a first panel 1121 and a second panel 1122 respectively for displaying various information. Note that a liquid crystal panel is used for the first panel 1121 and the second panel 1122 for comparison. However, as set forth above, a liquid crystal panel and a light emitting panel may be used in combination, or only a light emitting panel may be used for the first panel 1121 and the second panel 1122.

The second housing 1108 is configured in the same manner as the conventional one shown in FIG. 6A. In the mobile phone shown in FIG. 6B, display screens of the first panel 1121 and the second panel 1122 have a first display area 1161 and a second display area 1162 respectively, and are controlled by an element group 1123 that has a controller IC, a power supply IC and the like. The thickness of the housing on the side provided with the display device, namely the first housing 1131 is denoted by T2.

In the configuration of the conventional display device shown in FIG. 6A, the respective element groups each having a controller IC, a power supply IC and the like are provided for the first panel 1102 and the second panel 1103, thereby different images can be displayed on both display screens of the first and second panels 1102 and 1103 at a time. This applies to the case where two or more persons face each other with the portable information terminal to see both the display screens.

In the mobile phone that is often for personal use, however, it seems unlikely that one user sees both the display screens at a time. For example, in sending and receiving e-mails, the user requires only the display screen of the first panel 1102 to display images and does not require the display screen of the second panel 1103. In order to protect privacy, it is often preferable that no image is displayed on the display screen of the panel that is not seen by the user.

Particularly in the flip mobile phone as shown in FIG. 6A, the user does not see the display screen of the first panel 1102 when using the display screen of the second panel 1103 with the housing closed, thus images are required to be displayed on the display screen of the second panel 1103 only. Accordingly, the respective element groups each having a controller IC, a power supply IC and the like for controlling the first panel 1121 and the second panel 1122 are not required to be provided for the first and second panels. Instead, one element group 1123 having a controller IC, a power supply IC and the like may be provided in common for the first panel 1121 and the second panel 1122 as shown in FIG. 6B.

When an element group having a controller IC, a power supply IC and the like for controlling a display screen of a panel is provided in common for a plurality of panels, reduction in size, thickness, and cost of the mobile phone can be achieved.

When comparing the thickness of the first housing in FIGS. 6A and 6B, the thickness T2 of the first housing 1131 shown in FIG. 6B can be thinner than the thickness T1 of the first housing 1101 shown in FIG. 6A. This can be achieved by providing a smaller number of element groups each having a controller IC, a power supply IC and the like in FIG. 6B than in FIG. 6A. Further, when comparing the size of the display screen in FIGS. 6A and 6B, the display screen of FIG. 6B can be made larger than that of FIG. 6A because of a smaller number of element groups each having a controller IC, a power supply IC and the like in FIG. 6B.

Figure 7:
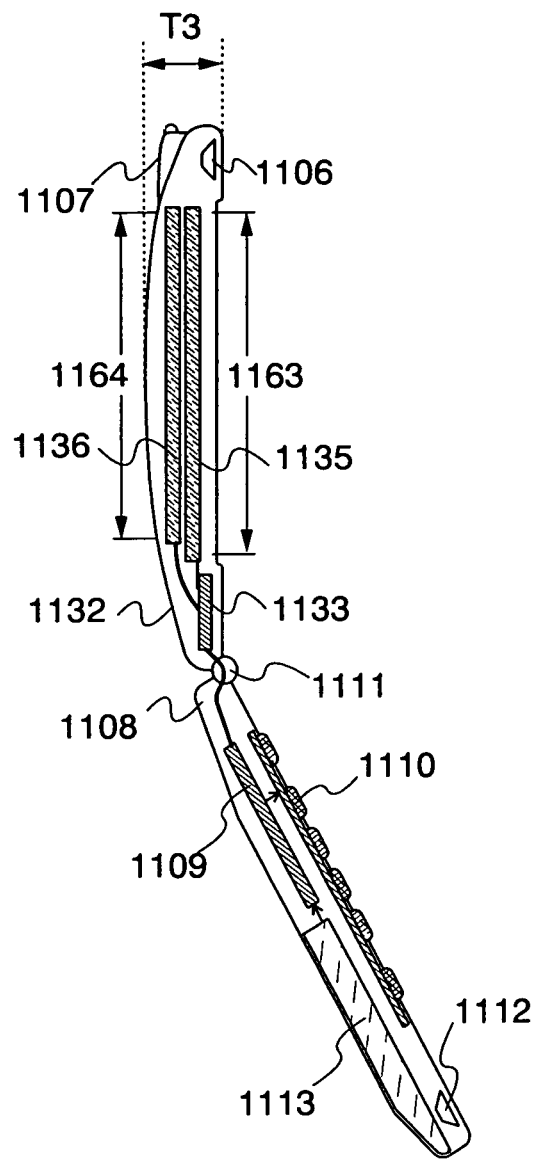
FIG. 7 is a cross sectional view of a flip mobile phone.

FIG. 7 shows a flip mobile phone using light emitting panels for the first and second panels. The mobile phone shown in FIG. 7 has a first housing 1132 and the second housing 1108. The second housing 1108, similarly to that shown in FIGS. 6A and 6B, includes the main body driving module 1109, the operating button module 1110, the microphone 1112, the battery 1113, and the like. The first housing 1132 and the second housing 1108 are connected with the hinge 1111 that is relatively rotatable.

A first light emitting panel 1135 and a second light emitting panel 1136 for displaying various information are provided on both sides of the first housing 1132. Similarly to FIG. 6B, display screens of the first and second light emitting panels 1135 and 1136 are controlled by one element group 1133 having a controller IC, a power supply IC and the like. Reference numeral 1163 denotes a first display area while 1164 denotes a second display area. The housing on the side provided with the display device, namely the first housing 1132 has a thickness T3.

When the light emitting panel is used, the thickness of the first housing can be further reduced as compared with the case of using the liquid crystal panel shown in FIGS. 6A and 6B. In addition, the element group having a controller IC, a power supply IC and the like is provided in common for the first panel and the second panel, thus the display area of the second panel can be increased without increasing the thickness of the first housing.

Although the light emitting panels are used for the first and second panels in FIG. 7, it is also possible to provide a light emitting panel for the first panel and a liquid crystal panel for the second panel, or to provide a liquid crystal panel for the first panel and a light emitting panel for the second panel. If a light emitting panel and a liquid crystal panel are provided for the first and second panels, a backlight may be provided in the liquid crystal panel, or light from the light emitting panel may be emitted in both directions to be used as a light source of the liquid crystal panel.

The flip mobile phone is taken as an example for description in this embodiment mode. However, the invention is not limited to this and may also be applied to other display devices and electronic apparatuses as long as they have a main display screen and a sub-display screen.

As set forth above, controlling the display screens of the first panel and the second panel by one element group having a controller IC, a power supply IC and the like leads to significant reduction in size, thickness, and cost of a portable terminal such as a mobile phone.

Figure 14:
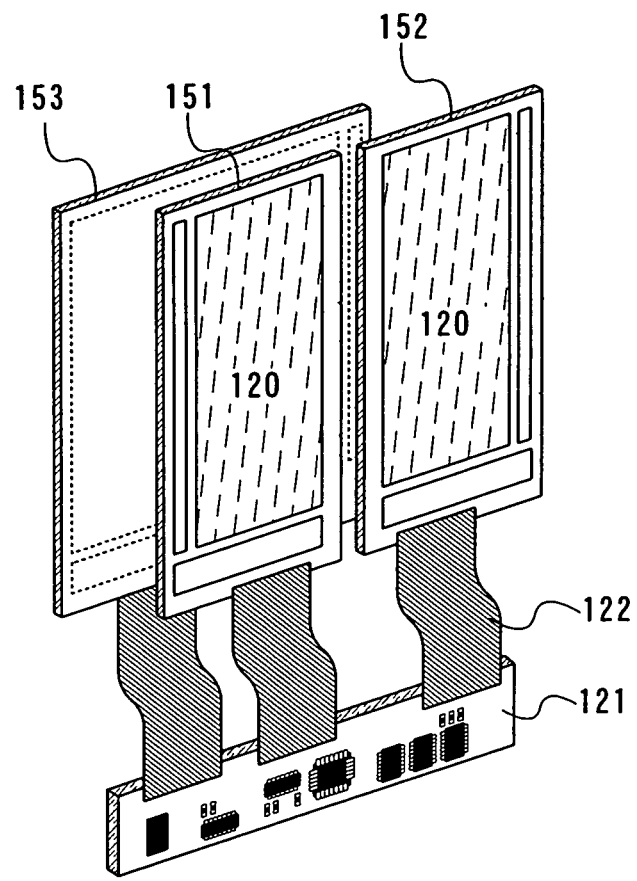
FIG. 14 is an example of a display device of the present invention.

Although two panels are provided in the display device in this embodiment mode, three or more panels may be provided as well. For example, as shown in FIG. 14, three panels (a first panel 151, a second panel 152, and a third panel 153) may be provided. In such a case also, an element group having a controller IC, a power supply IC and the like is provided in common for the first panel 151, the second panel 152, and the third panel 153.

Embodiment Mode 2

An embodiment mode of the invention is described with reference to FIGS. 8A and 8B and FIGS. 9A and 9B. FIGS. 8A and 8B and FIGS. 9A and 9B are cross sectional views of the display device of the invention, and more specifically, cross sectional views of the first panel and the second panel. The display device using light emitting panels for the first panel and the second panel is described with reference to FIGS. 8A and 8B.

A first light emitting panel 241 has a driving TFT 228 formed over a substrate 212. A first electrode 221 is electrically connected to a source electrode or a drain electrode of the driving TFT 228, an electroluminescent layer 222 is formed on the first electrode 221, and a second electrode 223 is formed on the electroluminescent layer 222. A stacked portion of the first electrode 221, the electroluminescent layer 222, and the second electrode 223 corresponds to a light emitting element 225. A protective film 224 is provided over the second electrode 223, and a sealing substrate 226 is provided over the protective layer 224 with a space in the drawing.

Figure 8A:
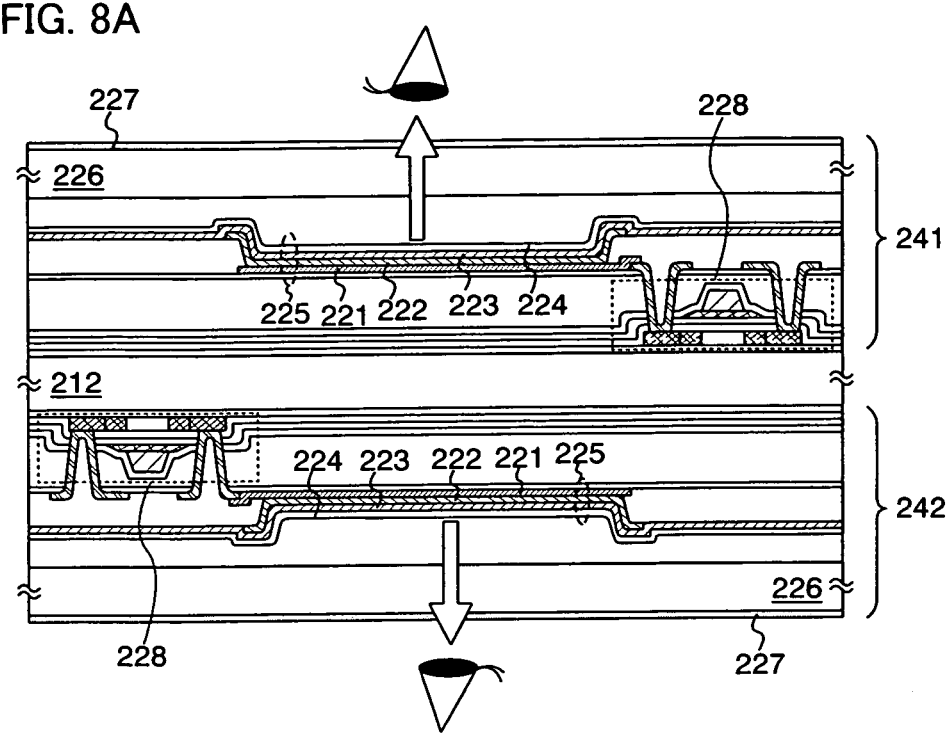
FIGS. 8A and 8B are cross sectional views of a display device.

In FIG. 8A, the material of electrodes of the light emitting element 225, namely the material of the first electrode 221 and the second electrode 223 (cathode and anode) is selected such that the first electrode 221 is made of a reflective material and the second electrode 223 is made of a light transmissive material. That is, light from the electroluminescent layer 222 is emitted to the second electrode 223 side. Note that a polarizer 227 is provided in contact with the sealing substrate 226 in FIG. 8A, though it is not necessarily provided depending on the required contrast and the use thereof. A second light emitting panel 242 can be provided similarly to the first light emitting panel 241.

Although light from the light emitting element 225 is emitted to the second electrode 223 side in FIG. 8A (top emission structure), the opposite structure may be adopted as well. In that case, the first electrode 221 is made of a light transmissive material while the second electrode 223 is made of a reflective material, thereby light from the electroluminescent layer 222 is emitted to the first electrode 221 side (bottom emission structure). Note that in the case of the bottom emission structure, the first electrode 221 is provided on the most exterior layer as shown in FIG. 8B.

Since a light emitting panel requires no backlight, a small and thin display device and electronic apparatus can be achieved while providing display screens on both sides.

Figure 8B:
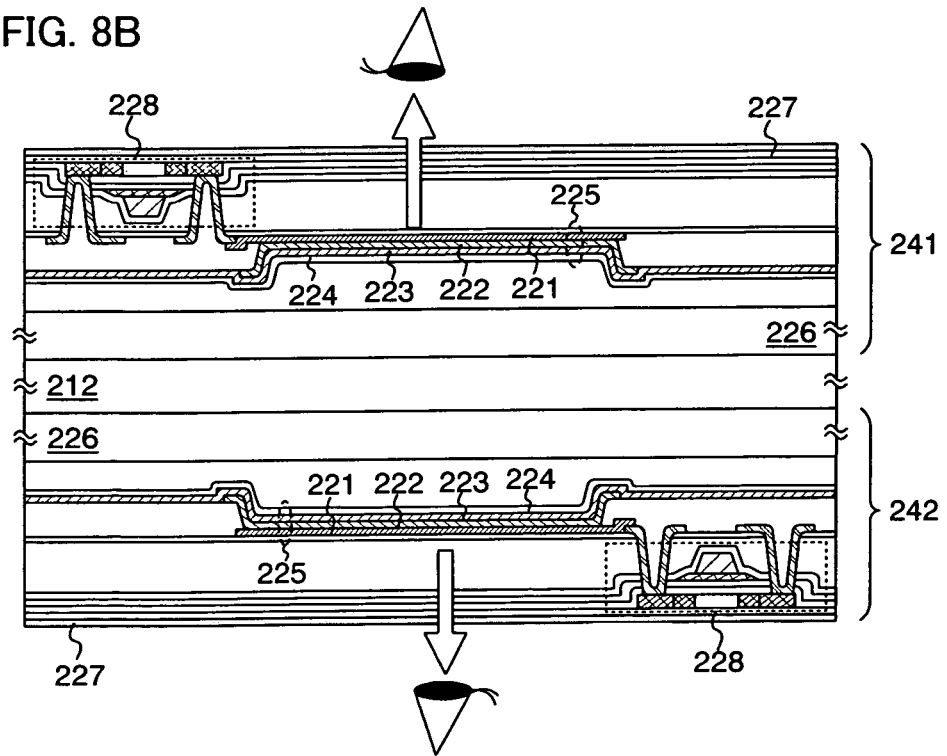

Although the light emitting panels are used for the first panel and the second panel in FIGS. 8A and 8B, the invention is not limited to this. Alternatively, liquid crystal panels may be used for the first panel and the second panel, or a light emitting panel may be used for one of the first panel and the second panel and a liquid crystal panel may be used for the other thereof. The latter case is shown in FIGS. 9A and 9B.

Figure 9A:
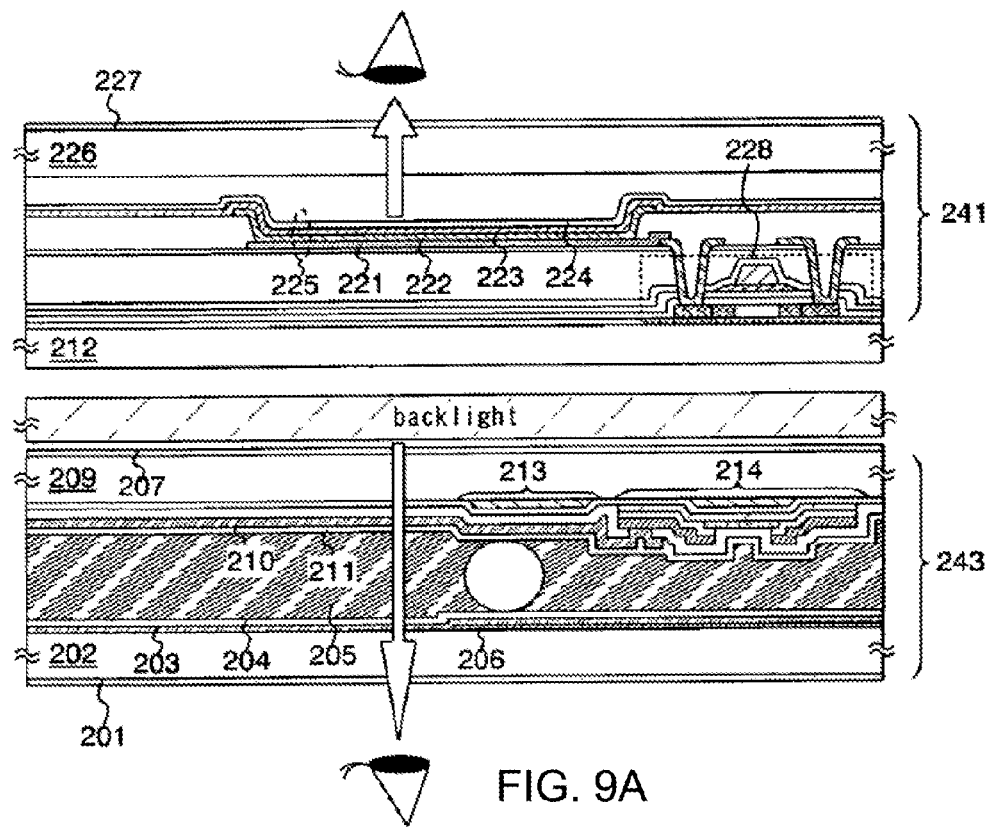
FIGS. 9A and 9B are cross sectional views of a display device.
Figure 9B:
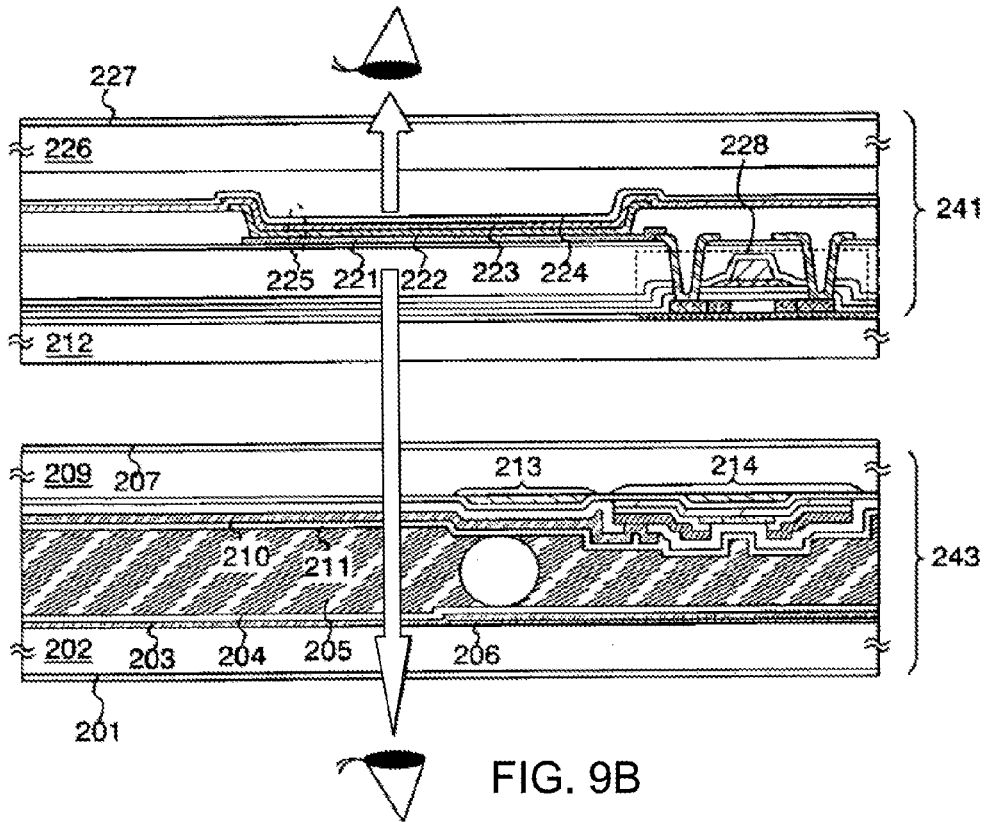

FIG. 9A shows a structure where a backlight is provided as a light source of a liquid crystal panel and FIG. 9B shows a structure where light is emitted in both directions from the light emitting panel and is used as a light source of the liquid crystal panel. The light emitting panel 241 can be provided similarly to FIGS. 8A and 8B. A liquid crystal panel 243 has a TFT 214 and a capacitor 213 formed over a substrate 209. A first electrode (pixel electrode) 210 is electrically connected to a source electrode or a drain electrode of the TFT 214. The liquid crystal panel 243 further has an alignment film 211, a liquid crystal layer 205, an alignment film 204, and a second electrode (counter electrode) 203. A shielding film 206 is provided under the TFT 214. Polarizers 201 and 207 are provided in contact with substrates 202 and 209 respectively. Light emitted from the backlight is used as a light source (FIG. 9A) or light emitted from the light emitting panel is used as a light source (FIG. 9B).

The TFTs 214 and 228 may use either an amorphous semiconductor (amorphous silicon) or a crystalline semiconductor (polysilicon). If polysilicon is used, a driver circuit as well as a pixel portion may be formed over the same substrate. In such a case, the number of external ICs can be reduced, which results in further reduction in size and thickness. Alternatively, an amorphous semiconductor and a crystalline semiconductor may be formed over the same substrate by devising a laser irradiation method and the like, thereby a pixel portion made of amorphous silicon and a driver circuit made of polysilicon can be obtained. It is needless to say that only the pixel portion may be formed of amorphous silicon and IC may be attached by TAB and the like, or a chip may be attached directly onto the substrate.

Figure 10:
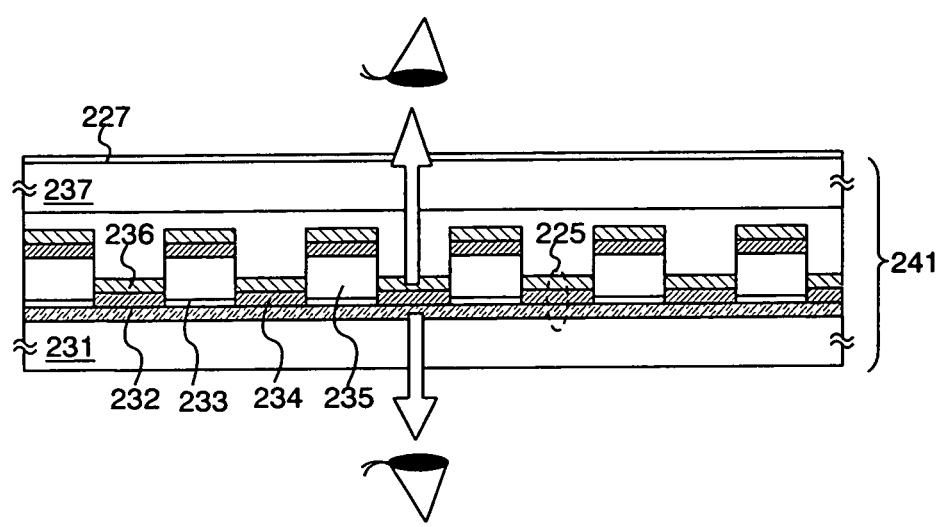
FIG. 10 is a cross sectional view of a display device.

As the light emitting panel, a passive matrix panel may be used instead of an active matrix panel including TFTs. FIG. 10 is a cross sectional view of a passive matrix panel. In FIG. 10, a first electrode (pixel electrode) 232, an electroluminescent layer 234, and a second electrode (counter electrode) 236 are formed over a substrate 231. A stacked portion of the first electrode 232, the electroluminescent layer 234, and the second electrode 236 corresponds to the light emitting element 225. Further, an insulating film 233 and a resin film 235 are provided so as to function as a bank.

The electroluminescent layer 234 may be formed of a material mainly containing an inorganic material. In that case, an insulating layer may be provided between the first electrode 232 and the electroluminescent layer 234 or between the second electrode 236 and the electroluminescent layer 234. The insulating layer may have a structure where aluminum oxide ($Al_2O_3$) and titanium oxide ($TiO_2$) are alternately stacked by thermal CVD utilizing adsorption reaction on the deposition surface. Note that this embodiment mode can be freely combined with Embodiment Mode 1.

Embodiment Mode 3

Described in this embodiment mode are configuration and relation of components of an electronic apparatus using a display device having a plurality of panels. The description is made with reference to block diagrams of FIGS. 2 to 4.

Figure 2:
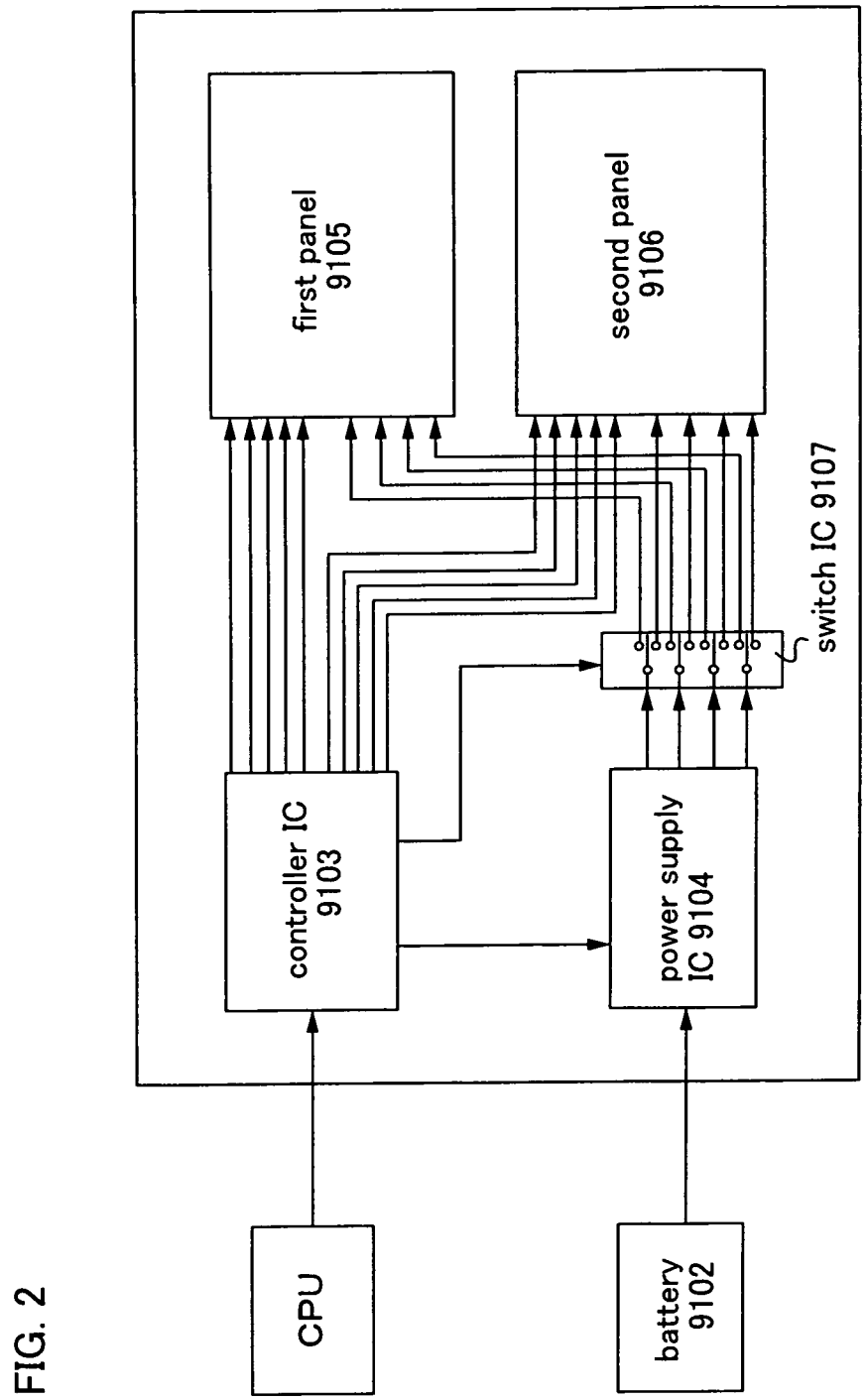
FIG. 2 is a block diagram showing a module configuration of a panel.

A display device having a main display screen and a sub-display screen is described with reference to FIG. 2. A controller IC 9103 and a power supply IC 9104 are provided in common for a first panel 9105 having a main display screen and a second panel 9106 having a sub-display screen, and control signal and voltage supplied thereto.

The controller IC 9103 processes a signal supplied from a CPU (Central Processing Unit) 9101 and transmits video signal data to a gate driver and a source driver of the first panel 9105 or the second panel 9106. The power supply IC 9104 processes a voltage supplied from a battery 9102 and supplies the processed voltage to the first panel 9105 or the second panel 9106 through a switch IC 9107. A signal and a voltage are selectively supplied to either the first panel 9105 or the second panel 9106 by the controller IC 9103 and the power supply IC 9104 that are provided in common for the two panels, thereby images are displayed. Which of the first and second panels 9105 and 9106 to be supplied with a signal and a voltage is selected by a switch provided in each panel depending on a signal from the CPU 9101.

The controller IC 9103 and the power supply IC 9104 are described next with reference to FIGS. 3 and 4.

Figure 3:
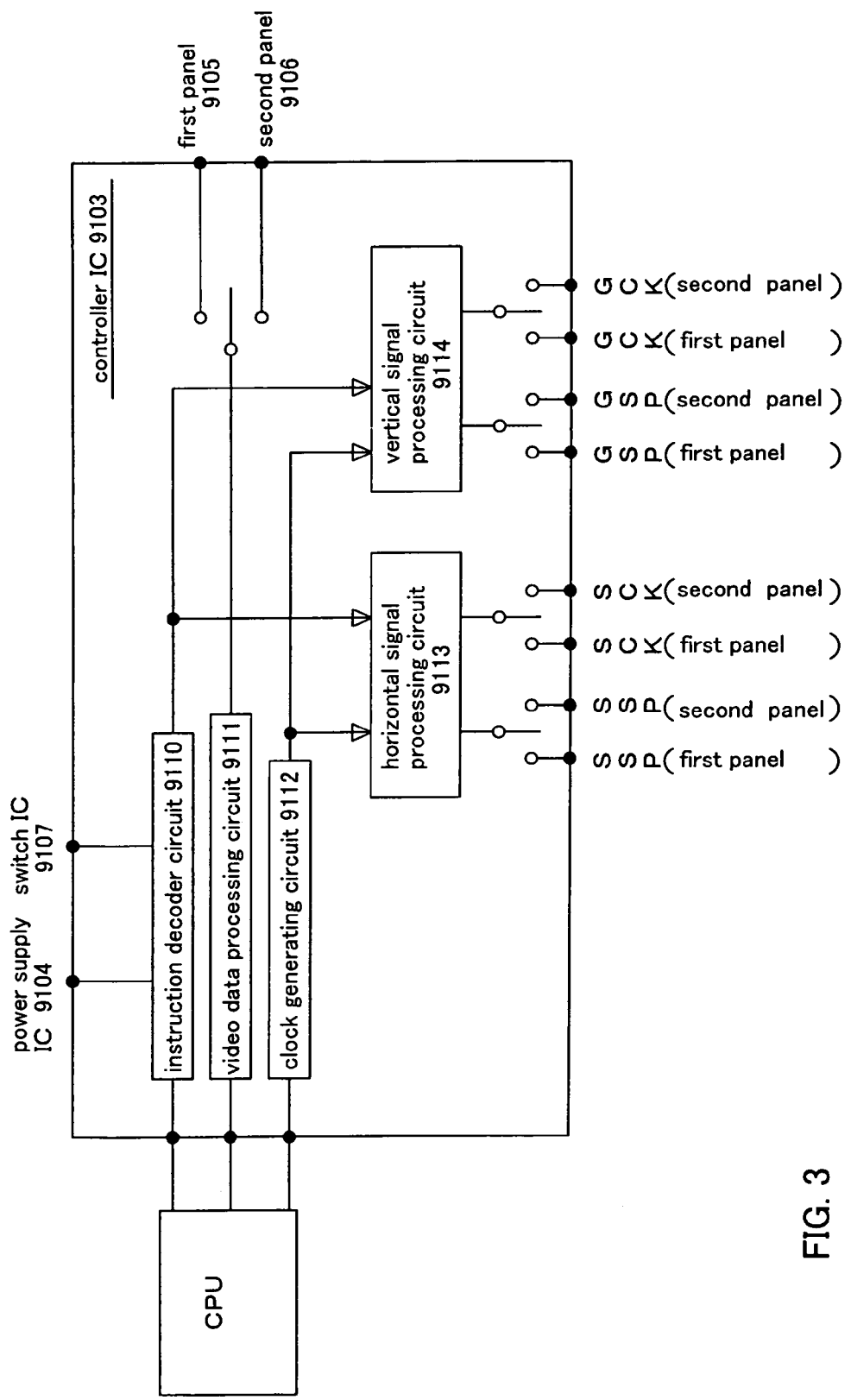
FIG. 3 is a block diagram showing a module configuration of a panel.

As shown in FIG. 3, the controller IC 9103 includes at least an instruction decoder circuit 9110, a video data processing circuit 9111, a clock generating circuit 9112, a horizontal signal processing circuit 9113, and a vertical signal processing circuit 9114. The instruction decoder circuit 9110 controls, in accordance with a signal supplied from the CPU 9101, the operation of the power supply IC 9104, the switch IC 9107, the horizontal signal processing circuit 9113, and the vertical signal processing circuit 9114. The video data processing circuit 9111 processes a signal supplied from the CPU 9101 and transmits video signal data to the first panel 9105 or the second panel 9106.

The clock generating circuit 9112 processes a signal supplied from the CPU 9101 and transmits the signal to the horizontal signal processing circuit 9113 and the vertical signal processing circuit 9114. In accordance with the inputted signal, the horizontal signal processing circuit 9113 and the vertical signal processing circuit 9114 generate a source start pulse (SSP) and a source clock signal (SCK), and a gate start pulse (GSP) and a gate clock signal (GCK) respectively to be transmitted to a source driver and a gate driver of the first panel 9105 or the second panel 9106. Which of the first panel 9105 and the second panel 9106 to be supplied with a signal is selected by a switch provided in each panel depending on a signal from the CPU 9101.

Figure 4:
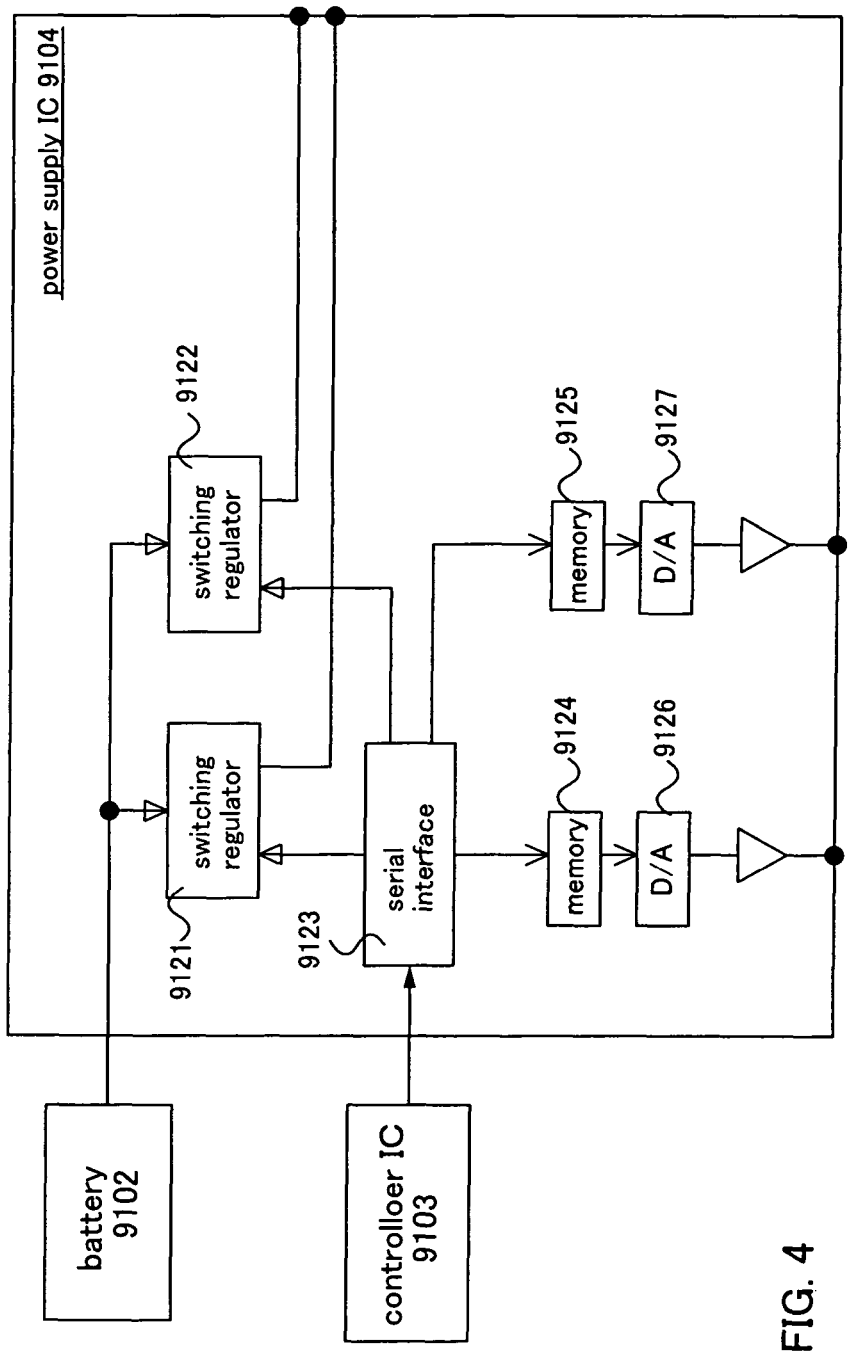
FIG. 4 is a block diagram showing a module configuration of a panel.

As shown in FIG. 4, the power supply IC includes at least switching regulators 9121 and 9122, a serial interface 9123, memories 9124 and 9125, and D/A converters 9126 and 9127. The switching regulators 9121 and 9122 monitor an output voltage (current) and control it so as to be constant. Here, the switching regulators 9121 and 9122 control a voltage supplied from the battery 9102 to be outputted to the source driver and the gate driver. The serial interface 9123 controls a signal to be transmitted to/received from the controller IC 9103. A signal from the controller IC 9103 is transmitted to the memories 9124 and 9125 and the D/A converters 9126 and 9127 through the serial interface 9123, so that the gray scale level of a video signal to be displayed on the first panel or the second panel can be controlled.

Although two panels are provided in the display device in this embodiment mode, three or more panels may be provided as well. In such a case also, a controller IC and a power supply IC are provided in common for the plurality of panels to control images to be displayed. Note that this embodiment mode can be freely combined with Embodiment Modes 1 and 2.

Embodiment Mode 4

Figure 5:
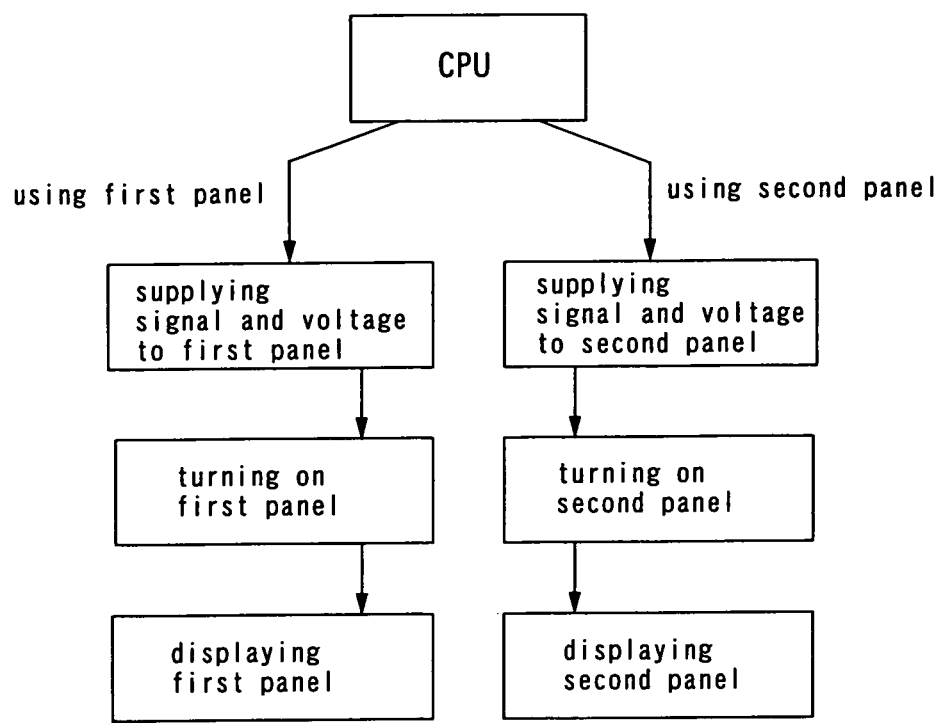
FIG. 5 is a flow chart for displaying images on a panel.

Described in Embodiment Mode 4 is operation of displaying images on a display screen when a controller IC, a power supply IC and the like are provided in common for the first panel and the second panel. The description is made with reference to a flowchart shown in FIG. 5.

First, which of display screens of the first panel and the second panel to be used for displaying images is selected. For example, in the case of a flip mobile phone, which of the two display screens to be used is selected depending on whether the mobile phone is folded or not.

If the first panel is selected to be used, images are displayed on the first panel. In that case, video signal data from the CPU is set to be supplied to the first panel to display images on the first panel.

Meanwhile, if the second panel is selected to be used, images are displayed on the second panel. In that case, video signal data from the CPU is set to be supplied to the second panel to display images on the second panel.

When the state is changed to display images on the second panel during a period where images are displayed on the display screen of the first panel, video signal data from the CPU is changed to be supplied to the second display panel. Similarly, when the state is changed to display images on the first panel during a period where images are displayed on the display screen of the second panel, video signal data from the CPU is changed to be supplied to the first panel. For example, when a flip mobile phone that is not folded is folded during a period where images are displayed on the display screen of the first panel, video signal data from the CPU is changed to be supplied to the second panel.

In this embodiment mode, respective element groups each having a controller IC, a power supply IC and the like are not provided for the two panels. Instead, a single element group having a controller IC, a power supply IC and the like is used in common for the first panel and the second panel by changing video signal data supplied to the panel by the instruction decoder circuit. Accordingly, reduction in size, thickness, and cost of the mobile phone can be achieved.

Although the flowchart is described by taking the flip mobile phone as an example in this embodiment mode, the flowchart can be applied to other display devices and electronic apparatuses each having a plurality of display screens. Further, this embodiment mode is not limited to the aforementioned display device having two display screens, and it can be applied to a display device having three or more display screens. This embodiment mode is more effective with more display screens. Note that this embodiment mode can be freely combined with the aforementioned embodiment modes.

Embodiment Mode 5

Described in this embodiment mode is displaying images on a plurality of display screens of panels. Whether monochrome or color images are displayed on the display screens of panels can be controlled by a light emitting material of a light emitting element and whether a color filter is used.

When a panel is a light emitting panel using a light emitting element, the following three cases are possible. First, if only white light emission is obtained from a light emitting element of a light emitting panel, monochrome images are displayed on a display screen of the light emitting panel. Second, if only white light emission is obtained from a light emitting element and a color filter is provided, color images are displayed on a display screen of the light emitting panel. Note that the color filter is provided on a surface of a substrate including the light emitting element. Third, if a light emitting panel has light emitting elements for RGB light emission, color images are displayed on a display screen of the light emitting panel.

When a panel is a liquid crystal panel using a liquid crystal, monochrome images are displayed on a display screen of a liquid crystal panel that does not include a color filter, while color images are displayed on a display screen of a liquid crystal panel that includes a color filter.

Although a color filter is used in this embodiment mode, the invention is not limited to this, and a color conversion layer (CCM layer) may be used as well. In addition, the invention is not limited to light emitting materials for RGB light emission, and materials that emit any color light may be used as well. Since each color light emitting material has different current density for obtaining a predetermined luminance, a color filter may be used secondarily. Note that a secondary color filter is not necessarily provided for each color, and may be provided corresponding to only one of RGB.

Displaying monochrome or color images by using a light emitting panel or a liquid crystal panel for a plurality of panels can be arbitrarily selected by the combination of such configurations. Which of the aforementioned configurations to be selected may be determined depending on an applied electronic apparatus and the use thereof. Further, which of a light emitting panel and a liquid crystal panel to be used for each panel may also be determined depending on an applied electronic apparatus and the use thereof.

This embodiment mode can be freely combined with the aforementioned embodiment modes.

Embodiment Mode 6

Figure 11A:
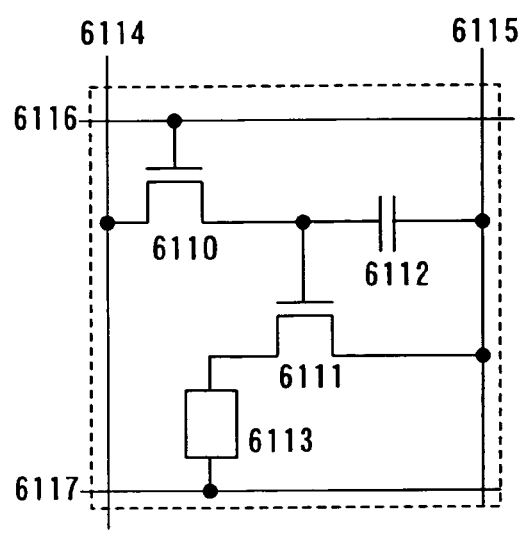
FIGS. 11A to 11C are circuit diagrams of a pixel portion.

A pixel circuit of a light emitting panel of the invention having a display function is described with reference to FIGS. 11A to 11C. FIG. 11A is an equivalent circuit diagram of a pixel. The pixel includes a TFT 6110 for controlling video signal input to the pixel, a TFT 6111 for controlling a current flowing between both electrodes of a light emitting element 6113, and a capacitor 6112 for holding a gate-source voltage of the TFT 6111, which are arranged in an area surrounded by a signal line 6114, power supply lines 6115 and 6117, and a scan line 6116. Although the capacitor 6112 is shown in FIG. 11A, it is not necessarily provided when the gate capacitance of the TFT 6111 or other parasitic capacitance can be used instead.

Figure 11B:
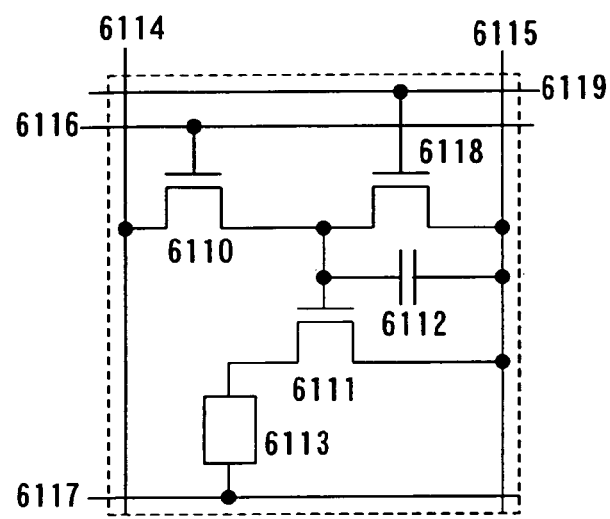

FIG. 11B is a pixel circuit where a TFT 6118 and a scan line 6119 are added to the pixel shown in FIG. 11A. The TFT 6118 can forcibly stop current flowing to the light emitting element 6113, thereby a lighting period can start simultaneously with or immediately after a writing period without waiting for signals to be written to all the pixels. Therefore, duty ratio is increased and high quality images, particularly moving images can be displayed.

Figure 11C:
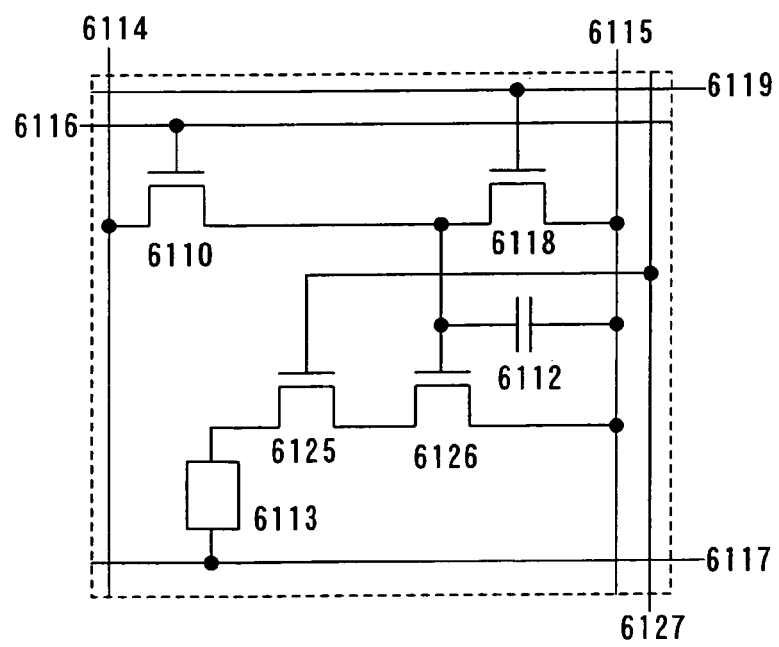

FIG. 11C is a pixel circuit where TFTs 6125 and 6126 and a wiring 6127 are added to the pixel shown in FIG. 11B and the TFT 6111 is omitted. In this configuration, a gate electrode of the TFT 6125 is connected to the wiring 6127 having a constant potential to fix the potential of the gate electrode, and the TFT 6125 operates in the saturation region. The TFT 6126 is connected in series to the TFT 6125 and operates in the linear region. A video signal for controlling lighting/nonlighting of the pixel is inputted to a gate electrode of the TFT 6126 through the TFT 6110. A small fluctuation in the gate-source voltage of the TFT 6126 does not influence the current flowing to the light emitting element 6113 since the TFT 6126 operating in the linear region has a small source-drain voltage. Accordingly, a current value flowing to the light emitting element 6113 is determined by the TFT 6125 operating in the saturation region. The channel length $L_1$ and channel width $W_1$ of the TFT 6125 and the channel length $L_2$ and channel width $W_2$ of the TFT 6126 may be set to satisfy $L_1/W_1:L_2/W_2=5000$ to 6000:1. It is preferable that the TFT 6125 and the TFT 6126 have the same conductivity in view of the manufacturing steps. A depletion TFT as well as an enhancement TFT may be used as the TFT 6125.

When a multi-gray scale image is displayed in a display device, either an analog driving method using an analog video signal or a digital driving method using a digital video signal is used. The difference between the two methods is a controlling method of a light emitting element in a light emitting state and a non-light emitting state. In the analog driving method, gray scale level is adjusted by controlling a current flowing to a light emitting element. Meanwhile, in the digital driving method, gray scale level is adjusted by using only two states of a light emitting element: on-state (where the luminance is approximately 100%) and off-state (where the luminance is approximately 0%). If only the on-state and the off-state are used in the digital driving method, an image can be displayed with no more than two gray scale levels. Therefore, in order to display a multi-gray scale image, the digital driving method is performed in combination with another method such as an area gray scale method and a time gray scale method.

If a digital video signal is used, the video signal may be either a voltage or a current. That is, a video signal inputted to a pixel in light emission of a light emitting element may be either a constant voltage or a constant current. When a video signal is a constant voltage, a constant voltage is applied to a light emitting element or a constant current flows to the light emitting element. Also, when a video signal is a constant current, a constant voltage is applied to a light emitting element or a constant current flows to the light emitting element. A driving method when a constant voltage is applied to a light emitting element is called a constant voltage drive. Meanwhile, a driving method where a constant current flows to a light emitting element is called a constant current drive. According to the constant current drive, a constant current flows regardless of changes in resistance of a light emitting element.

In the display device of the invention, either the analog driving method or the digital driving method may be used for a liquid crystal panel and a light emitting panel. The digital driving method may be combined with either the area gray scale method or the time gray scale method. Other driving methods that are not described in this embodiment mode may be used as well. Further, either the constant voltage drive or the constant current drive may be used.

Either an active matrix display device or a passive matrix display device may be used. If the active matrix display device is used, however, the analog driving method is preferably adopted when there are few variations in transistors in pixels, since a light emitting element is driven with current.

This embodiment mode can be freely combined with the aforementioned embodiment modes.

Embodiment Mode 7

Described in this embodiment mode is a configuration to correct changes in ambient temperature and changes with time that have an influence on a display screen when images are displayed using a light emitting panel. The description is made with reference to FIG. 13.

Figure 13:
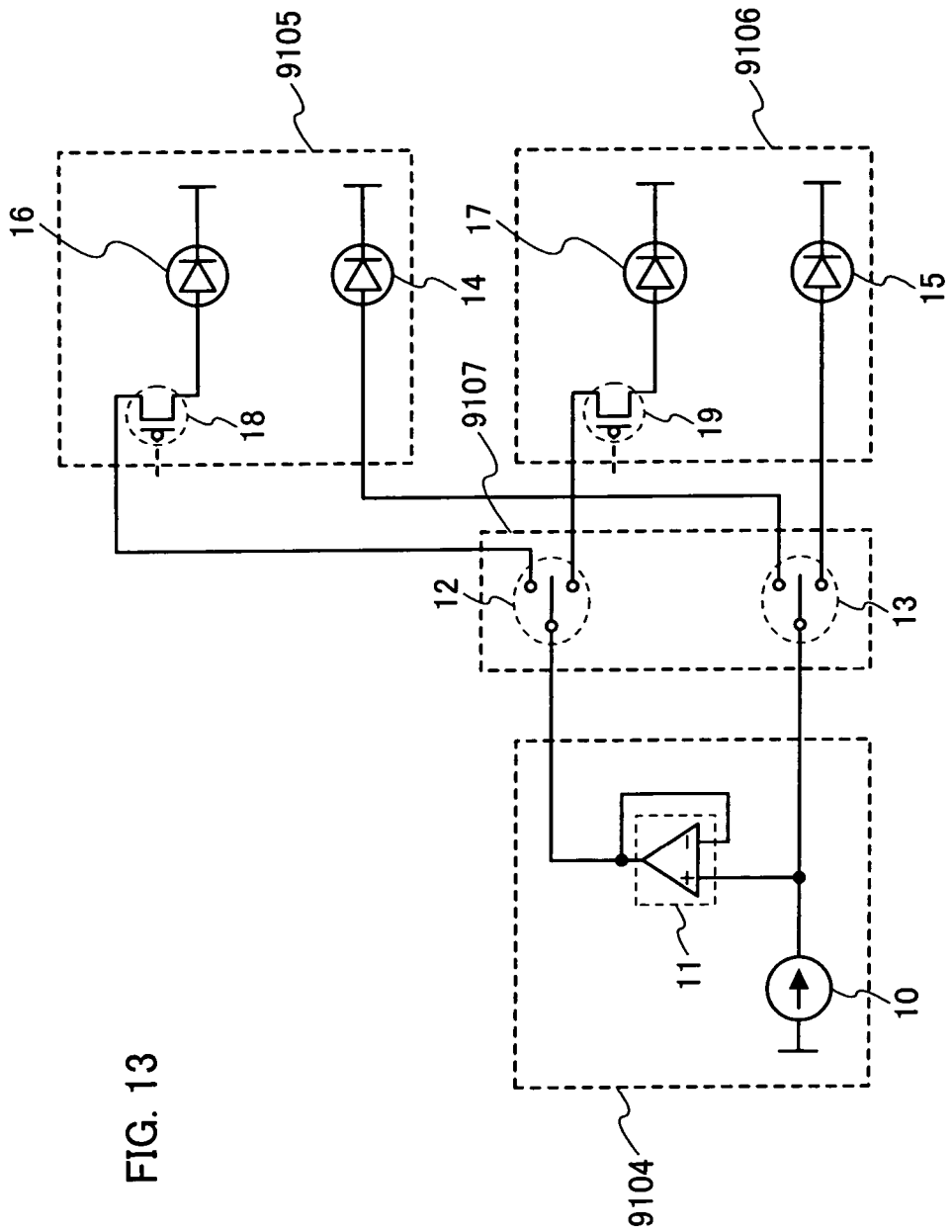
FIG. 13 is a diagram showing a configuration for correcting the external influence.

In FIG. 13, a first panel 9105 has a pixel area including a plurality of pixels arranged in matrix. Each of the pixels has a light emitting element 16 and at least two transistors, though a driving transistor 18 only is shown in the drawing, which is connected in series to the light emitting element 16. One of two electrodes of the light emitting element 16 is connected to a power supply, and the other is connected to an output terminal of a buffer amplifier 11 in a power supply IC 9104 through the driving transistor 18 and a switch 12 in a switch IC 9107.

One or more monitoring light emitting elements 14 are provided over the same substrate as the light emitting element 16. One of two electrodes of the monitoring light emitting element 14 is connected to a power supply, and the other is connected to a non-inverting input terminal of the buffer amplifier 11 through a switch 13 in the switch IC 9107.

A second panel 9106 is configured in the same manner as the first panel 9106, and includes a light emitting element 17 for displaying images and a monitoring light emitting element 15.

The light emitting element 16 and the monitoring light emitting element 14 in the first panel 9105, and the light emitting element 17 and the monitoring light emitting element 15 in the second panel 9106 are provided over the same substrate. In other words, the light emitting element 16, the monitoring light emitting element 14, the light emitting element 17, and the monitoring light emitting element 15 are manufactured under the same conditions by the same steps, and they have the same or substantially the same characteristics for changes in ambient temperature and changes with time.

A constant current is supplied to the monitoring light emitting elements 14 and 15 from a constant current source 10 in the power supply IC 9104. When changes in ambient temperature and changes with time occur at this time, the resistance of the monitoring light emitting elements 14 and 15 changes. Then, since the monitoring light emitting elements 14 and 15 have a constant current, the potential difference between two electrodes of each of the monitoring light emitting elements 14 and 15 changes. In the case of the aforementioned configuration, among the two electrodes of each of the monitoring light emitting elements 14 and 15, the potential of the electrode connected to the power supply does not change while the potential of the other electrode connected to the constant current source 10 changes. The changed potentials of the monitoring light emitting elements 14 and 15 are inputted to the non-inverting input terminal of the buffer amplifier 11.

The buffer amplifier 11 is a circuit for preventing variations that are caused by lord such as wiring capacitance when the potentials of the monitoring light emitting elements 14 and 15 are transmitted through wirings. A potential outputted from the output terminal of the buffer amplifier 11 is transmitted to the light emitting elements 16 and 17 through the driving transistors 18 and 19 respectively.

According to the aforementioned operation, when the characteristics of the monitoring light emitting elements 14 and 15 change with changes in ambient temperature and changes with time, the potentials of the light emitting elements 16 and 17 change in accordance with such changes. Thus, it is possible to suppress the influence of variations in current of the light emitting elements 16 and 17 caused by changes in ambient temperature and changes with time.

Switching between the first panel 9105 and the second panel 9106 is performed using the switches 12 and 13 in the switch IC 9107. According to the invention, the correction can be performed without user operation. Thus, the correction can be continued after the device is supplied to an end user, which is expected to result in longer life of the device.

In the case of color display, electroluminescent layers with different emission wavelengths may be formed in each pixel, and typically, electroluminescent layers corresponding to each color of red (R), green (G), and blue (B) are formed in each pixel. In such a case, the monitoring light emitting elements 14 and 15, the constant current source 10, and the buffer amplifier 11 corresponding to each color of red, green, and blue may be provided, thereby a power supply potential is corrected for each color.

This embodiment mode can be freely combined with the aforementioned embodiment modes.

Embodiment Mode 8

The invention can be applied to various electronic apparatuses such as a video camera, a digital camera, a goggle type display, a navigation system, an audio reproducing device such as a car audio system, a computer, a game machine, a portable information terminal (mobile computer, mobile phone, portable game machine, electronic book and the like), and an image reproducing device provided with a recording medium such as a home game machine (specifically, a device that reproduces a recording medium such as a DVD and has a display for displaying the reproduced images). Specific examples of these electronic apparatuses are shown in FIGS. 12A to 12G.

Figure 12A:
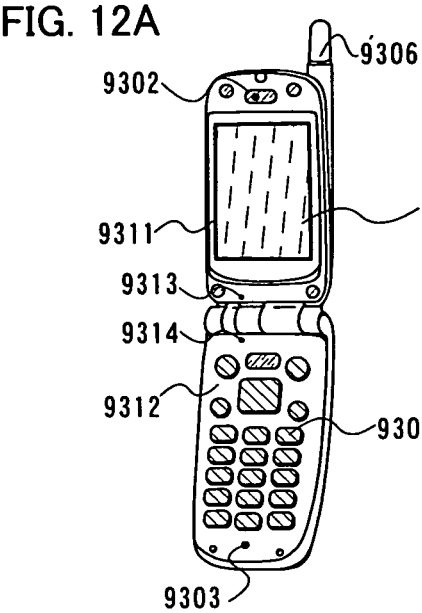
FIGS. 12A to 12G are views each showing an electronic apparatus using a display device of the invention.
Figure 12B:
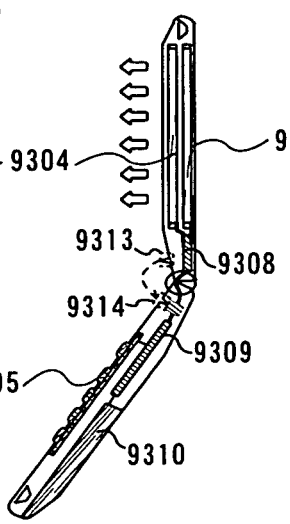
Figure 12C:
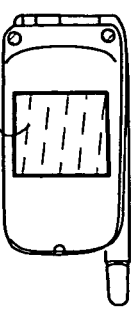

FIGS. 12A to 12C show a mobile phone including a speaker 9302, a microphone 9303, a display portion 9304, a button 9305, an antenna 9306, a display portion 9307, a controller IC 9308, a main body driving module 9309, a battery 9310, and the like. When the mobile phone is not folded (FIGS. 12A and 12B), images are displayed on the display portion 9304 that is a main display screen, and when the mobile phone is folded (FIG. 12C), images are displayed on the display portion 9307 that is a sub-display screen. In that case, the display portions 9304 and 9307 are controlled by a single element group such as the controller IC 9308 and a power supply IC. Which of the display portion 9304 and the display portion 9307 to be used for displaying images is determined by an open/close detecting unit. The open/close detecting unit includes a projection 9313 that is provided in a first housing 9311, and a hole 9314 and a control unit 9315 that are provided in a second housing 9312. When the mobile phone is closed, the projection 9313 is in contact with the control unit 9315 disposed under the hole 9314, and the control unit 9315 controls to display images on the display portion 9307. Meanwhile, when the mobile phone is opened, the projection 9313 is not in contact with the control unit 9315, and the control unit 9313 controls to display images on the display portion 9304. In this manner, the invention can be applied to such a display device having the display portions 9304 and 9307 on the front and back sides. Note that the open/close detecting unit is just an example and not limited to the aforementioned configuration.

Figure 12D:
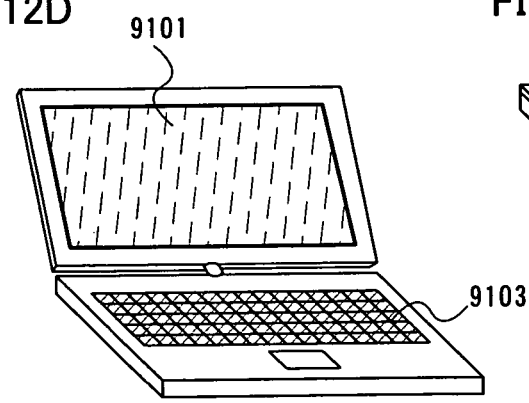
Figure 12E:
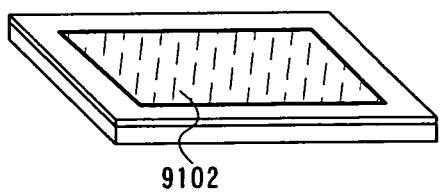

FIGS. 12D and 12E show a tablet PC that is one of portable terminals, which includes display portions 9101 and 9102, a button 9103 and the like. The display portion 9101 is used when the tablet PC is opened, while the display portion 9102 is used when the table PC is closed. The invention can be applied to such a display device having the display portions 9101 and 9102 on the front and back sides.

Figure 12F:
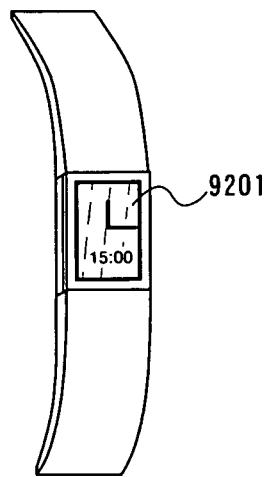
Figure 12G:
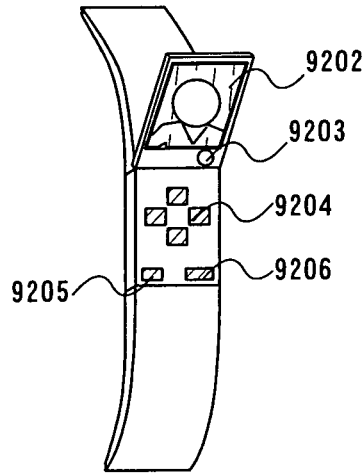

FIGS. 12F and 12G show a watch type portable terminal including display portions 9201 and 9202, a camera 9203, a button 9204, a microphone 9205, a speaker 9206 and the like. As described in Embodiment Mode 1, the display portions 9201 and 9202 can be controlled by a controller IC, a power supply IC and the like that are provided in common. The invention can be applied to such a display device having the display portions 9101 and 9102 on the front and back sides. Note that this embodiment mode can be freely combined with the aforementioned embodiment modes.

This application is based on Japanese Patent Application serial No. 2004-152553 filed in Japan Patent Office on May 21, 2004, the contents of which are hereby incorporated by reference.

What is claimed is:

1. A display device comprising:
a plurality of display units in a housing having a front surface and a rear surface opposed to the front surface; and
a power supply IC provided in common for the plurality of display units, controlling a voltage supplied to the plurality of display units,
wherein the power supply IC comprises a unit for determining which of the plurality of display units is to be supplied with the voltage,
wherein a first one of the plurality of display units comprises a first substrate, a first thin film transistor over the first substrate, and a light emitting element comprising first and second electrodes and an electroluminescent layer provided between the first and second electrodes, and wherein the first thin film transistor is electrically connected to one of the first and second electrodes,
wherein a second one of the plurality of display units comprises a second substrate, a second thin film transistor over the second substrate, and a liquid crystal layer over the second thin film transistor,
wherein the first substrate is adjacent to the second substrate,
wherein the first one of the plurality of display units has a first display screen on the front surface, and the second one of the plurality of display units has a second display screen on the rear surface,
wherein light from the light emitting element is emitted in directions of the first display screen and the second display screen, and
wherein the light emitted in the direction of the second display screen is used as a light source of the second one of the plurality of display units.

2. The display device according to claim 1, wherein each of the plurality of display units comprises a panel including a display screen; and an image is displayed on one display screen while no image is displayed on the other display screens.

3. The display device according to claim 2, wherein a monochrome image or a color image is displayed on the panel.

4. The display device according to claim 1, wherein the display device is applied to an electric apparatus selected from the group consisting of a mobile phone, a tablet PC and a watch type portable terminal.

5. The display device according to claim 1, further comprising a driver circuit over each of the first substrate and the second substrate.

6. A display device comprising:
a plurality of display units in a housing having a front surface and a rear surface opposed to the front surface;

a controller IC provided in common for the plurality of display units, controlling a signal supplied to the plurality of display units; and a power supply IC provided in common for the plurality of display units, controlling a voltage supplied to the plurality of display units, wherein the controller IC comprises a unit for determining which of the plurality of display units is to be supplied with the signal; and wherein the power supply IC comprises a unit for determining which of the plurality of display units is to be supplied with the voltage, wherein a first one of the plurality of display units comprises a first substrate, a first thin film transistor over the first substrate, and a light emitting element comprising first and second electrodes and an electroluminescent layer provided between the first and second electrodes, wherein the first thin film transistor is electrically connected to one of the first and second electrodes, wherein a second one of the plurality of display units comprises a second substrate, a second thin film transistor over the second substrate, and a liquid crystal layer over the second thin film transistor, wherein the first substrate is adjacent to the second substrate, wherein the first one of the plurality of display units has a first display screen on the front surface, and the second one of the plurality of display units has a second display screen on the rear surface, wherein light from the light emitting element is emitted in directions of the first display screen and the second display screen, and wherein the light emitted in the direction of the second display screen is used as a light source of the second one of the plurality of display units.

7. The display device according to claim 6, wherein each of the plurality of display units comprises a panel including a display screen; and an image is displayed on one display screen while no image is displayed on the other display screens.

8. The display device according to claim 7, wherein a monochrome image or a color image is displayed on the panel.

9. The display device according to claim 6, wherein the display device is applied to an electric apparatus selected from the group consisting of a mobile phone, a tablet PC and a watch type portable terminal.

10. The display device according to claim 6, further comprising a driver circuit over each of the first substrate and the second substrate.

11. A display device comprising:
a first panel and a second panel in a housing having a front surface and a rear surface opposed to the front surface; and a power supply IC provided in common for the first panel and the second panel, controlling a voltage supplied to the first panel or the second panel, wherein the power supply IC comprises a unit for determining which of the first panel and the second panel is to be supplied with the voltage, wherein the first panel comprises a first substrate, a first thin film transistor over the first substrate, and a light emitting element comprising first and second electrodes and an electroluminescent layer provided between the first and second electrodes, wherein the first thin film transistor is electrically connected to one of the first and second electrodes, wherein the second panel comprises a second substrate, a second thin film transistor over the second substrate, and a liquid crystal layer over the second thin film transistor, wherein the first substrate is adjacent to the second substrate, wherein the first panel has a first display screen on the front surface, and the second panel has a second display screen on the rear surface, wherein light from the light emitting element is emitted in directions of the first display screen and the second display screen, and wherein the light emitted in the direction of the second display screen is used as a light source of the second panel.

12. The display device according to claim 11, wherein a monochrome image or a color image is displayed on the panel.

13. The display device according to claim 11, wherein the display device is applied to an electric apparatus selected from the group consisting of a mobile phone, a tablet PC and a watch type portable terminal.

14. The display device according to claim 11, further comprising a driver circuit over each of the first substrate and the second substrate.

15. A display device comprising:
a first panel and a second panel in a housing having a front surface and a rear surface opposed to the front surface;

a controller IC provided in common for the first panel and the second panel, controlling a signal supplied to the first panel or the second panel; and a power supply IC provided in common for the first panel and the second panel, controlling a voltage supplied to the first panel or the second panel, wherein the controller IC comprises a unit for determining which of the first panel and the second panel is to be supplied with the signal; and wherein the power supply IC comprises a unit for determining which of the first panel and the second panel is to be supplied with the voltage, wherein the first panel comprises a first substrate, a first thin film transistor over the first substrate, and a light emitting element comprising first and second electrodes and an electroluminescent layer provided between the first and second electrodes, wherein the first thin film transistor is electrically connected to one of the first and second electrodes, wherein the second panel comprises a second substrate, a second thin film transistor over the second substrate and a liquid crystal layer over the second thin film transistor, wherein the first substrate is adjacent to the second substrate, wherein the first panel has a first display screen on the front surface, and the second panel has a second display screen on the rear surface, wherein light from the light emitting element is emitted in directions of the first display screen and the second display screen, and wherein the light emitted in the direction of the second display screen is used as a light source of the second panel.

16. The display device according to claim 15, wherein the first panel and the second panel are electrically connected to the controller IC through an FPC.

17. The display device according to claim 15, wherein a monochrome image or a color image is displayed on the panel.

18. The display device according to claim 15, wherein the display device is applied to an electric apparatus selected from the group consisting of a mobile phone, a tablet PC and a watch type portable terminal.

19. The display device according to claim 15, further comprising a driver circuit over each of the first substrate and the second substrate.

* * * * *